(12) United States Patent
Amorim (10) Patent No.: US 6,910,811 B2
(45) Date of Patent: Jun. 28, 2005

(54) OPTICAL FIBER ALIGNMENT DEVICE AND METHOD

(75) Inventor: Goncalo Agra Amorim, Ipswich (GB)

(73) Assignee: Agilent Technologies, Inc., Palo Alto, CA (US)

( * ) Notice: Subject to any disclaimer, the term of this patent is extended or adjusted under 35 U.S.C. 154(b) by 213 days.

(21) Appl. No.: 10/241,020

(22) Filed: Sep. 11, 2002

(65) Prior Publication Data

US 2003/0081912 A1 May 1, 2003

(30) Foreign Application Priority Data

Oct. 31, 2001 (EP) .............................................. 01309227

(51) Int. Cl.⁷ ................................................ G02B 6/36
(52) U.S. Cl. .............................. 385/90; 385/52; 385/25; 385/92
(58) Field of Search ............................. 385/90, 52, 25, 385/58, 77, 92, 91, 93, 94, 95

(56) References Cited

U.S. PATENT DOCUMENTS

| 4,865,410 | A | | 9/1989 | Estrada et al. | ............. | 350/96.2 |
|---|---|---|---|---|---|---|
| 4,883,342 | A | * | 11/1989 | Ishii et al. | ..................... | 385/90 |
| 5,937,123 | A | | 8/1999 | Frelier | .......................... | 385/79 |
| 5,963,696 | A | * | 10/1999 | Yoshida et al. | ............... | 385/91 |
| 6,074,103 | A | | 6/2000 | Hargreaves et al. | .......... | 385/90 |
| 6,164,837 | A | * | 12/2000 | Haake et al. | ................. | 385/90 |
| 6,190,056 | B1 | * | 2/2001 | Kwon et al. | .................. | 385/91 |
| 6,652,158 | B2 | * | 11/2003 | Bartur et al. | ................. | 385/92 |
| 6,709,169 | B2 | * | 3/2004 | Rossi | .......................... | 385/92 |

FOREIGN PATENT DOCUMENTS

| EP | 0 443 454 | 8/1991 |
|---|---|---|
| JP | 55166972 | 12/1980 |
| JP | 02245711 | 1/1990 |

* cited by examiner

Primary Examiner—K. Cyrus Kianni (57) ABSTRACT

A device and method for alignment of an optical fiber with an output facet of a laser diode that are to be co-located on a mount, to obtain a substantially optimum coupling efficiency. The device is particularly applicable to assemblies to be used in a submarine.

8 Claims, 7 Drawing Sheets

OPTICAL FIBER ALIGNMENT DEVICE AND METHOD

FIELD OF THE INVENTION

This invention relates to a device and method for aligning an optical fiber with the output facet of a laser diode.

DISCUSSION OF THE BACKGROUND ART

Coupling efficiency between an optical fiber and a laser diode is limited by the accuracy and stability of the alignment achievable during the assembly process. Alignment of an optical fiber and a laser diode may be achieved by placing the optical fiber using a feature which has been etched onto a silicon 'optical bench', upon which the laser diode has already been precisely attached. However, this simple technique is limited in precision by the manufactured accuracy of the silicon and the fiber and subsequent movement due to thermal stresses during the joining process. Another technique uses a mount to support the optical fiber. Once the laser and the optical fiber have been aligned and attached to the bench, the mount is mechanically deformed until an optimum coupling efficiency is achieved. However, this technique suffers from the disadvantage of creep or flow of the deformed material and is therefore not stable in the long term. Creep is a natural result of the aging process, but is more acute where materials are subjected to stress. Furthermore, the problem of creep is increased due to the high temperature to which such coupling assemblies are likely to be subjected. Such creep reduces the coupling efficiency between the laser and the fiber as the assembly ages.

In the coupling device of this invention a high coupling efficiency between a fiber and a laser diode is aimed for, therefore it is important that the fiber tip is at an optimum distance from the laser diode, typically between 5 μm and 10 μm from the laser facet. However, as the fiber tip is so close to the output facet of the laser this means that a small displacement from the optimum position causes a significant drop in coupling efficiency. At distances further from the output facet of the laser, displacements from the optimum position do not have such a great effect but coupling efficiency is reduced. Therefore it is important in a coupling device which is aiming for a high efficiency of coupling that the device is stable, i.e. that ageing does not cause the tip of the fiber to be displaced even a small amount from an optimum coupling position.

This invention serves to alleviate such problems of reliability and stability, and is particularly beneficial for components requiring high reliability.

SUMMARY OF THE INVENTION

According to the present invention there is provided a device for aligning an optical fiber with the output facet of a laser diode to obtain a substantially optimum coupling efficiency, the device comprising a universal joint through which the optical fiber passes such that the end of the optical fiber is adjacent to the output facet of the laser diode; and an adjustment means located at a distance from the universal joint such that displacement of the adjustment means causes a pivotal movement of the fiber about a pivotal point of the universal joint and results in a smaller displacement of the end of the optical fiber.

To aid hermetic sealing for high reliability, in one embodiment the universal joint comprises a flexible material between the optical fiber and a mount.

In another embodiment the universal joint comprises a ball, having an aperture through the centre for receiving the optical fiber;

a mount housing the ball;

biasing means for biasing the ball into an internal conical socket within the mount, the socket having an aperture through which the optical fiber protrudes. In this embodiment the biasing force may be provided by the ball being magnetised, and the conical socket comprising a magnetic material or by some form of spring loading.

Preferably the adjustment means comprises a disk supporting the optical fiber having a spring for biasing the ball into the socket, and in which displacement of the disk results in a pivotal movement of the fiber about the centre of the ball, and a corresponding smaller displacement of the end of the optical fiber.

According to another aspect of the invention there is provided a method of aligning an optical fiber with the output facet of a laser diode, in which the laser diode is supported on a mount, the method comprising the steps of passively aligning the output facet of the laser diode with the end of fiber;

attaching the laser diode to the mount;

actively aligning the end of the fiber with the laser diode, using a fine adjustment means supporting the fiber at a point displaced from a universal joint through which the fiber passes, by displacing the fine adjustment means to cause the optical fiber to pivot about a pivotal point of the universal joint and to induce a corresponding smaller displacement in the end of the optical fiber, until a substantially optimum coupling efficiency is achieved; and securing the optical fiber in the position which achieves said substantially optimum coupling efficiency.

Preferably the securing step comprises attaching the fine adjustment means to the mount.

BRIEF DESCRIPTION OF THE DRAWINGS

Embodiments of the invention will now be described, by way of example only, with reference to the accompanying drawings, in which.

DETAILED DESCRIPTION OF THE PREFERRED EMBODIMENT

Figure 1:
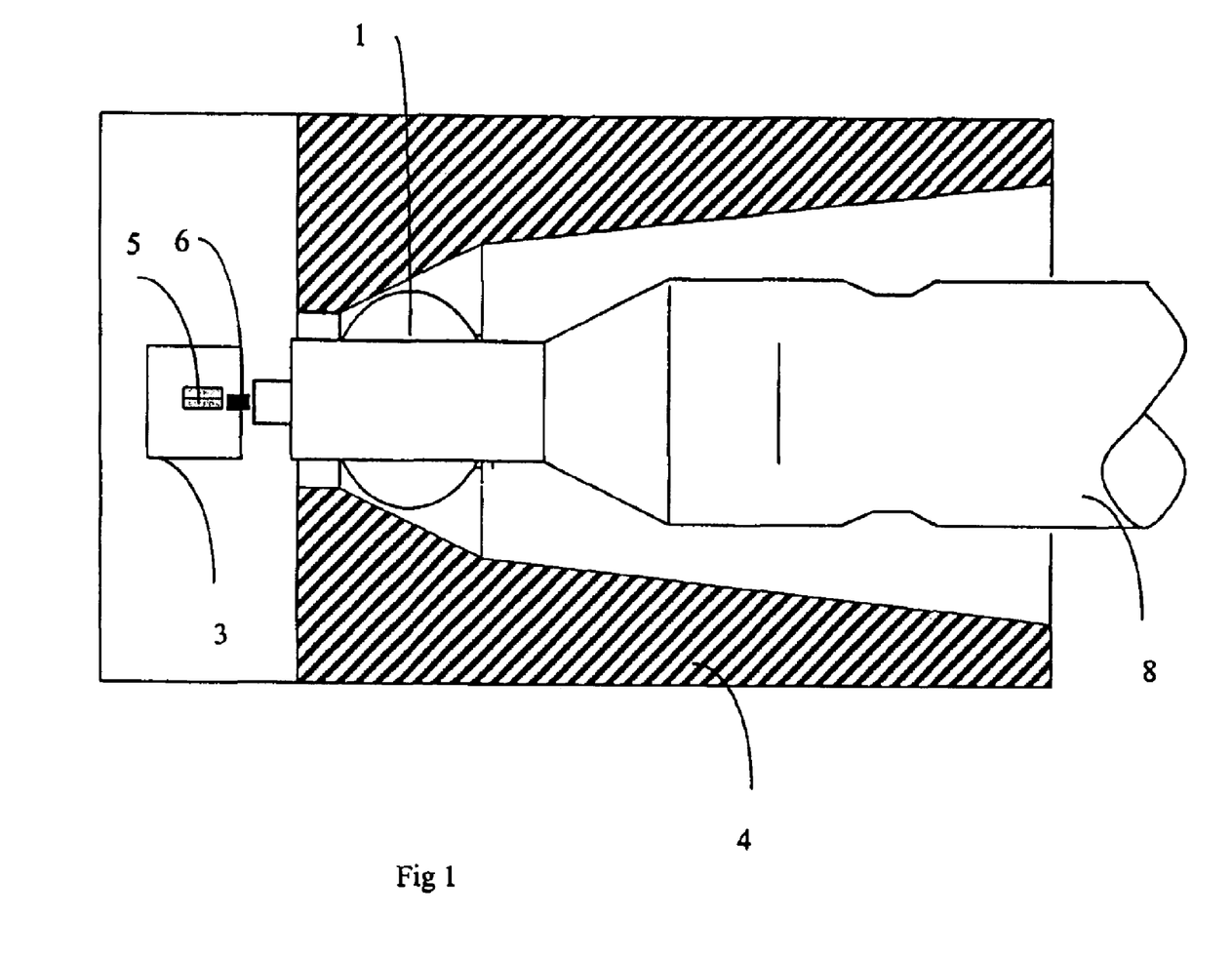
FIG. 1 is a cross section of part of an alignment device viewed from the top.

Referring now to FIG. 1 a laser diode 5 is mounted on a thermally conductive bench 3. The bench is fabricated from a material with a low thermal expansion coefficient such as Kovar, a nickel cobalt iron alloy. Other materials that work well include copper tungsten alloys which are materials which combine the conductivity of copper, thus providing heat spreading, with the low expansion coefficient of tungsten. Other suitable materials may be used for fabrication of the bench 3. It is possible to calculate limits for the thermal expansion of the chosen material, and to compensate for such expansion when designing the assembly.

The bench 3 and an optical fiber 6, which is mounted in a stainless steel tube 8, are co-located in a mount 4. The optical fiber is inserted centrally in the stainless steel tube. Any misalignment of the optical fiber 6 with the centre of the tube 8 is compensated for during a passive alignment procedure, which is described later.

The laser diode 5 is coupled directly to the fiber 6, without the necessity for a focussing lens between the end of the laser diode and the fiber core, although it will be understood by those skilled in the art that this invention is also applicable to alignment of a fiber with a laser diode where a focussing lens is used.

The mount 4 has a hollow and generally cylindrical portion which houses a ball 1. The ball 1 may be glass or ceramic or stainless steel, for example. The ball 1 has an aperture passing through the centre, which receives the fiber 6 together with the tube 8. The ball 1 is biased against an internal conical socket in the mount, which has a co-axial aperture through which the optical fiber protrudes. The ball and the conical socket act together to form a universal joint with a pivotal point substantially at the centre of the ball 1.

Figure 2:
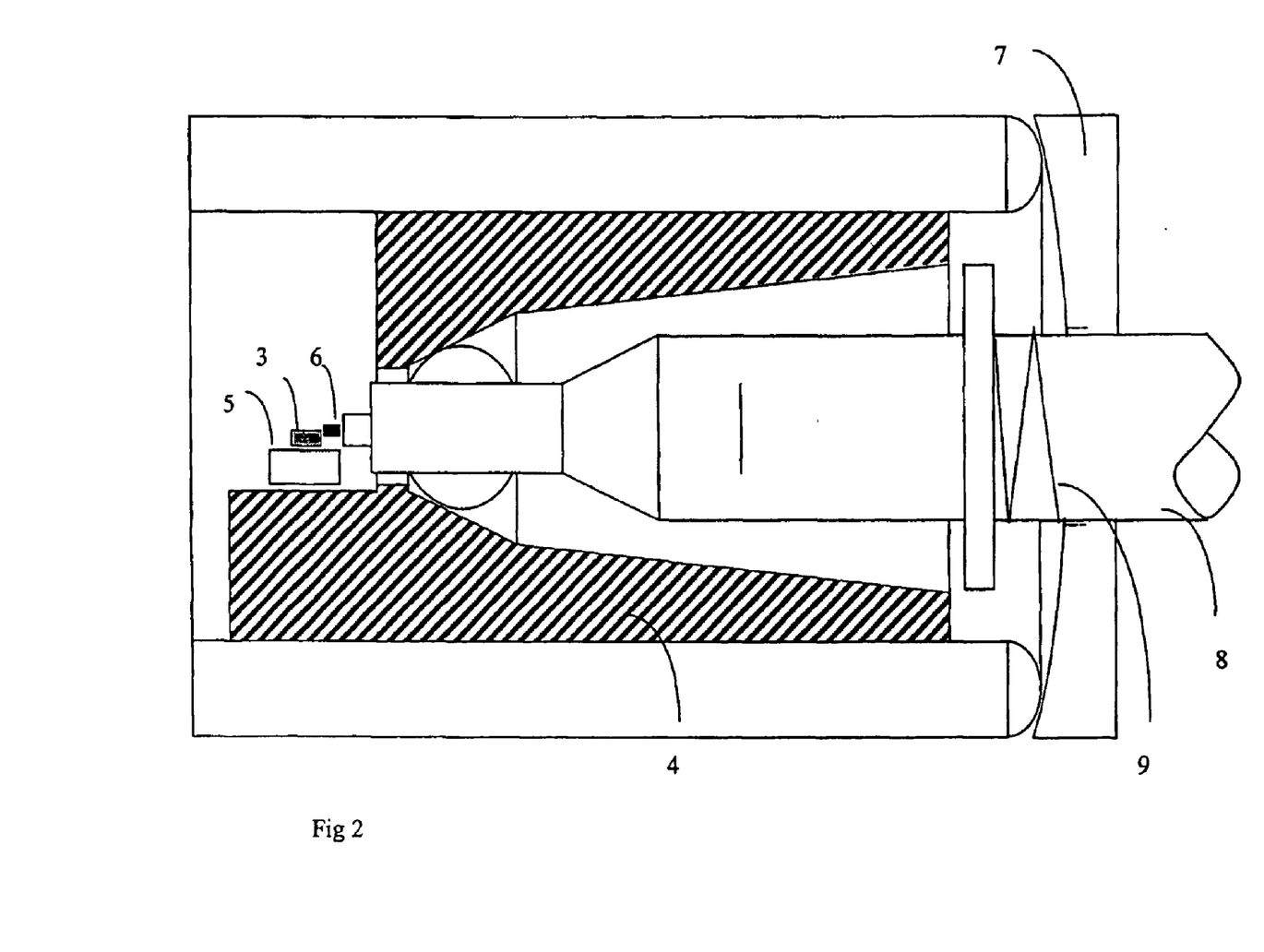
FIG. 2 is a cross section of the alignment device of FIG. 1 viewed from the side.

Referring now to FIG. 2, which shows a sectional view from the side of the alignment device of FIG. 1, at the opposite end to the conical socket the generally cylindrical portion of the mount 4 has a larger aperture into which the fiber 6 together with the tube passes. A disk 7, fabricated from copper tungsten, Kovar or stainless steel, for example, has a spring 9 for biasing the ball 1 into the socket. The disk 7 is secured to the stainless steel tube 8.

In an alternative embodiment the ball may be fabricated from a magnetic material which has been magnetised, the magnetic forces serving to bias the ball into the stainless steel conical socket. Rare earth magnets such as neodymium are especially suitable for this purpose as they have a high coercivity, which means that the magnetic forces will be greater for a lower volume of material.

Whatever material is used for manufacture of the ball, it is important that it is easy to form the cylindrical aperture in the ball, and that it is possible to manufacture a sphere to extremely high tolerances, so that irregularities in the shape of the ball don't cause any displacement from the optimum coupling position. Furthermore, it is important that the material is very hard so that it will not wear as the assembly ages.

During a first stage of alignment, the laser diode 5 is aligned with the end of an optical fiber 6. Such alignment is referred to as passive alignment, because the devices are aligned optically (i.e. by eye with the aid of an optical microscope with approximately 50 to 250 times magnification). Such passive alignment lacks precision, firstly because although the laser diode generally has an active stripe which may be used to aid alignment, the position of the stripe may lack precision. Secondly, the passive alignment procedure is a planar alignment, therefore, because the output facet of the laser may not be precisely manufactured such that the output facet may not be set at precisely 90° to the top and sides of the laser diode, the fiber 6 is unlikely to be in the optimum orientation after such passive alignment.

After the fist stage of alignment the bench 3 is welded to the mount 4. During the welding process some relative movement between the laser diode 5 and the optical fiber 6 is likely to occur due to thermal stresses caused by the localised heating of material at the base of the bench 3.

The light from the laser diode 5 is emitted in a conical shape. It is important to place the tip of the fiber at the point of maximum power.

Figure 3:
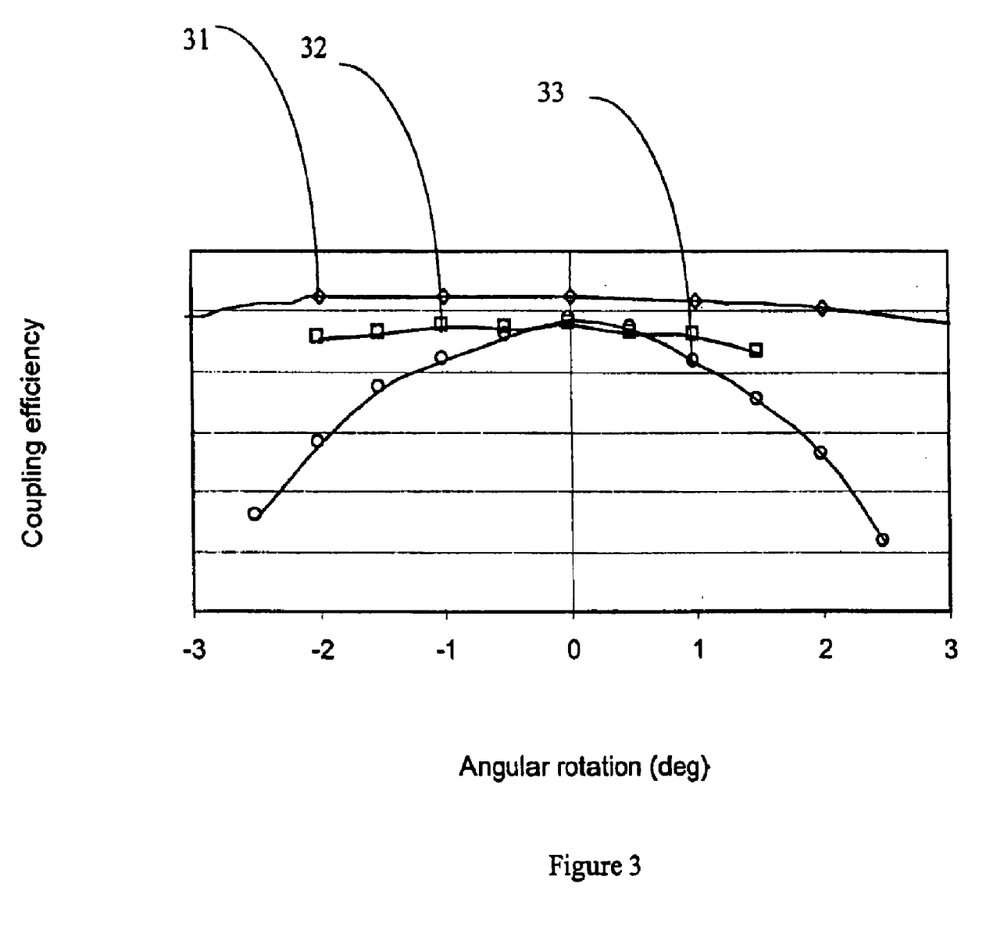
FIG. 3 is a graph illustrating how coupling efficiency between a laser diode and an optical fiber is affected by the angular orientation of the fiber.

FIG. 3 illustrates an example of how coupling efficiency is affected by the angular orientation of the fiber in perpendicular planes, and also how the coupling efficiency is affected by coaxial rotation of the fiber. Rotation of the fiber in the vertical plane is illustrated by the line is illustrated by the line 32, rotation in the horizontal plane is illustrated by the line 33, and coaxial rotation is illustrated by the line 31. In this example there is a difference in effect between rotation in a vertical plane and rotation in a horizontal plane.

Displacement of the disk 7 is used to finely align the end of the optical fiber 6 with the laser diode 5. This fine alignment is an active alignment, meaning that the alignment is carried out with the laser switched on, and the coupling between the laser diode 5 and the optical fiber 6, is measured. Once a maximum coupling efficiency is achieved then the laser diode and the optical fiber are considered to be optimally aligned.

Figure 4:
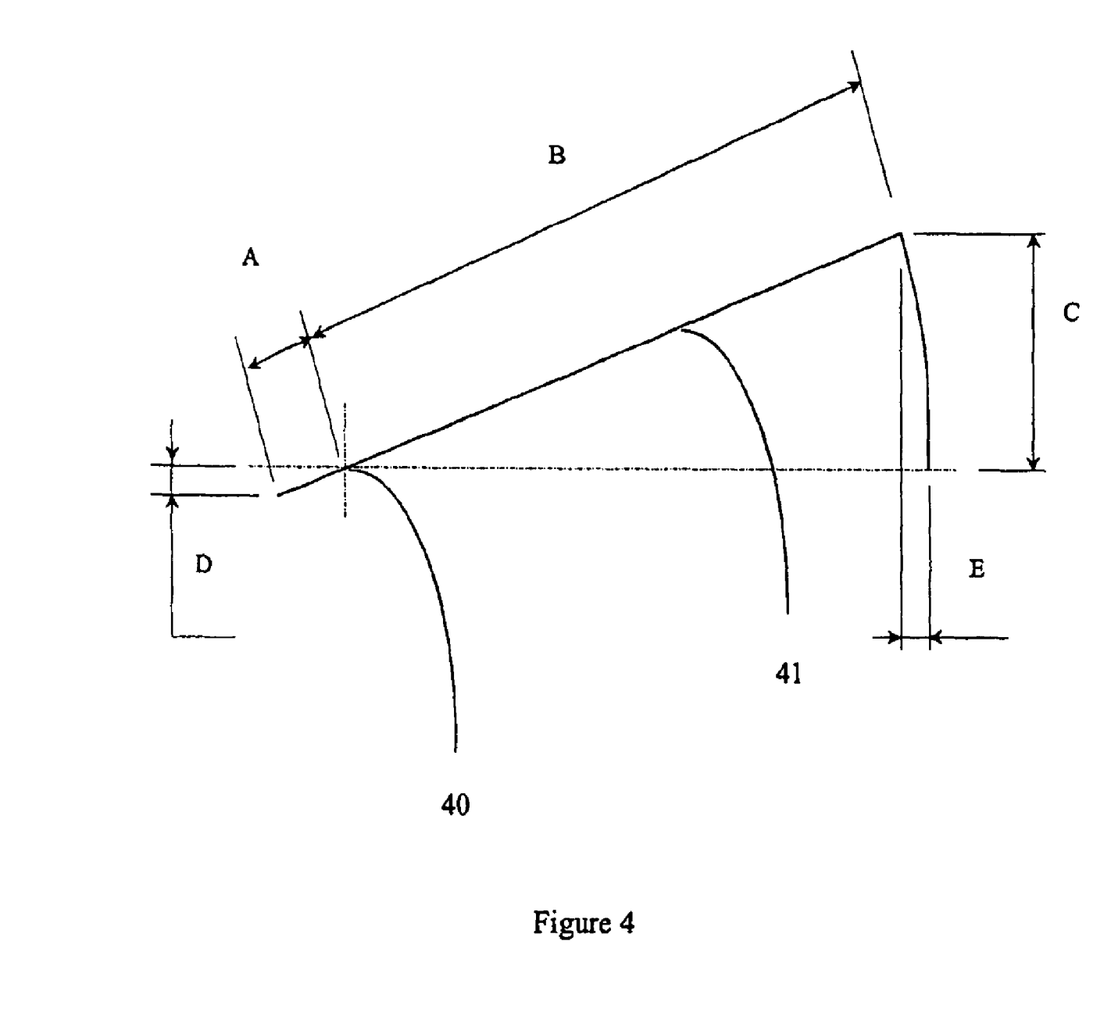
FIG. 4 illustrates parameters of a lever design.

Displacement of the disk 7 causes rotation of the optical fiber 6 about the pivotal point of the universal joint formed by the ball and the conical socket. The ratio of the distance between the pivotal point and the disk, and the distance between the pivotal point and the end of the fiber is approximately 9:1 in this embodiment of the invention. Therefore, displacement of the disk by a particular amount, results in a corresponding displacement of the end of the fiber by one ninth that amount. In this embodiment of the invention it is possible to displace the disk accurately to within approximately 1 $\mu$m (one micron), resulting in a corresponding displacement of the end of the fiber by approximately 111 nm. The maximum rotation angle is set to 2°. FIG. 4 illustrates an example lever design, where an optical fiber 42 pivots about a point 40. If A is set to be equal to 2 mm then B is equal to 18 mm for a 9:1 ratio, therefore for a required maximum rotation angle of 2° the maximum displacement C of the disk and the maximum displacement D of the fiber tip may be calculated as C=18×tan(2)=0.629 mm D=2×tan(2)=70 $\mu$m The displacement E, inevitably caused by the rotation of the lever is calculated as follows.

E=18×(1−cos(2))=2.74 $\mu$m

The fiber is rotated by displacement of the disk 7 and the power of the optical signal in the fiber is measured. Once the position at which a maximum power is obtained, that position is recorded as the optimum coupling position. Once the optimum coupling efficiency has been achieved during the active alignment procedure by displacement of the disk 7, the disk 7 is spot welded at three circumferentially equidistant points around the larger aperture of the mount 4. Three equidistant welded points have been found to be very stable, although it is possible to use more welds. In the welding machines used in the embodiment of the invention described, it is convenient to rotate the welder by 60° and spot weld at three more equidistant points to create six equidistant spot welds.

Whilst the spot welding of the disk may cause some relative movement between the end of the fiber 6 and the output facet of the laser diode 5, any displacement of the disk will only cause a displacement of the fiber tip of one ninth of that displacement.

Figure 5:
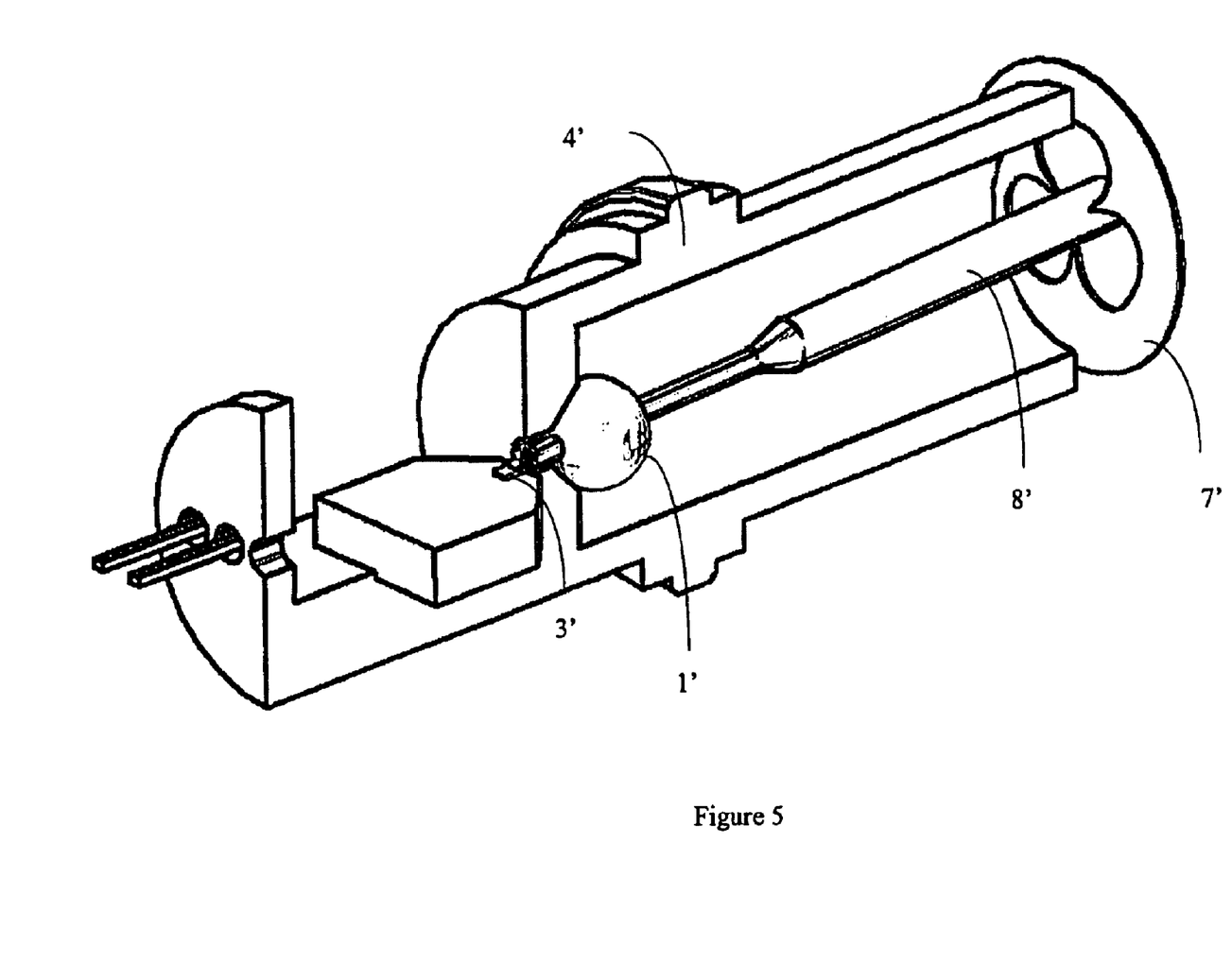
FIG. 5 is a perspective view, partially cut away, of an alignment device.

Referring now to FIG. 5 which shows a perspective view of an alternative embodiment of the invention, the disk 7' is shown in more detail. The design of the disk 7' limits the amount of 'play' between the disk and the stainless steel tube 8' which occurs when the disk is displaced. If a circular aperture were used, for example, then the amount of play between the disk 7' and the tube 8' could be significant unless the aperture were precisely the same diameter as the tube 8'. Ideally the disk 7' is manufactured in such a way that the disk has built in concentric stresses, so that the disk has a high reluctance for coaxial misalignment. One technique is to use metal injection moulding to fabricate the disk. As the part shrinks built in stresses occur.

For high reliability, it is important that the assembly is sealed adequately. Any gaps between the ball and socket can be sealed using adhesive after the active alignment process described earlier.

Figure 6:
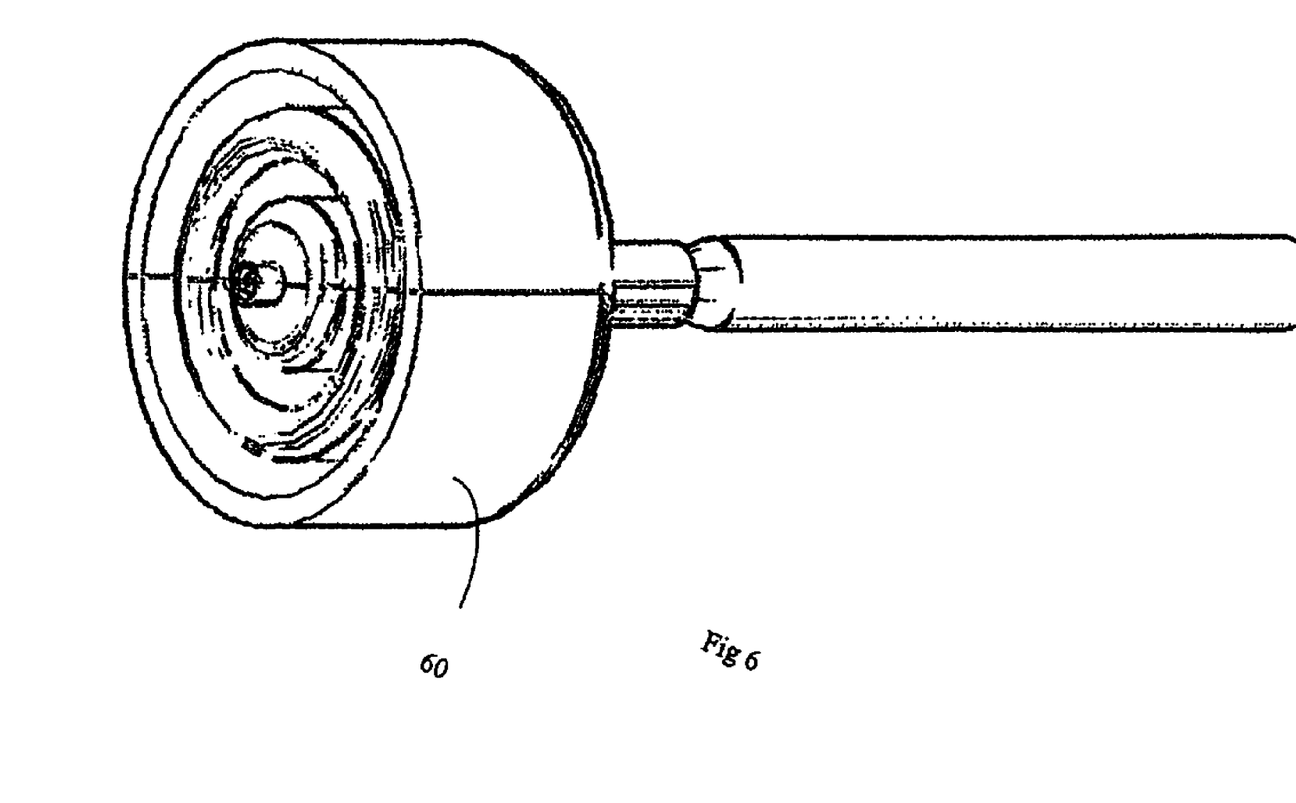
FIG. 6 shows part of a flexible joint which may be used as an alternative to a ball and socket joint.
Figure 7:
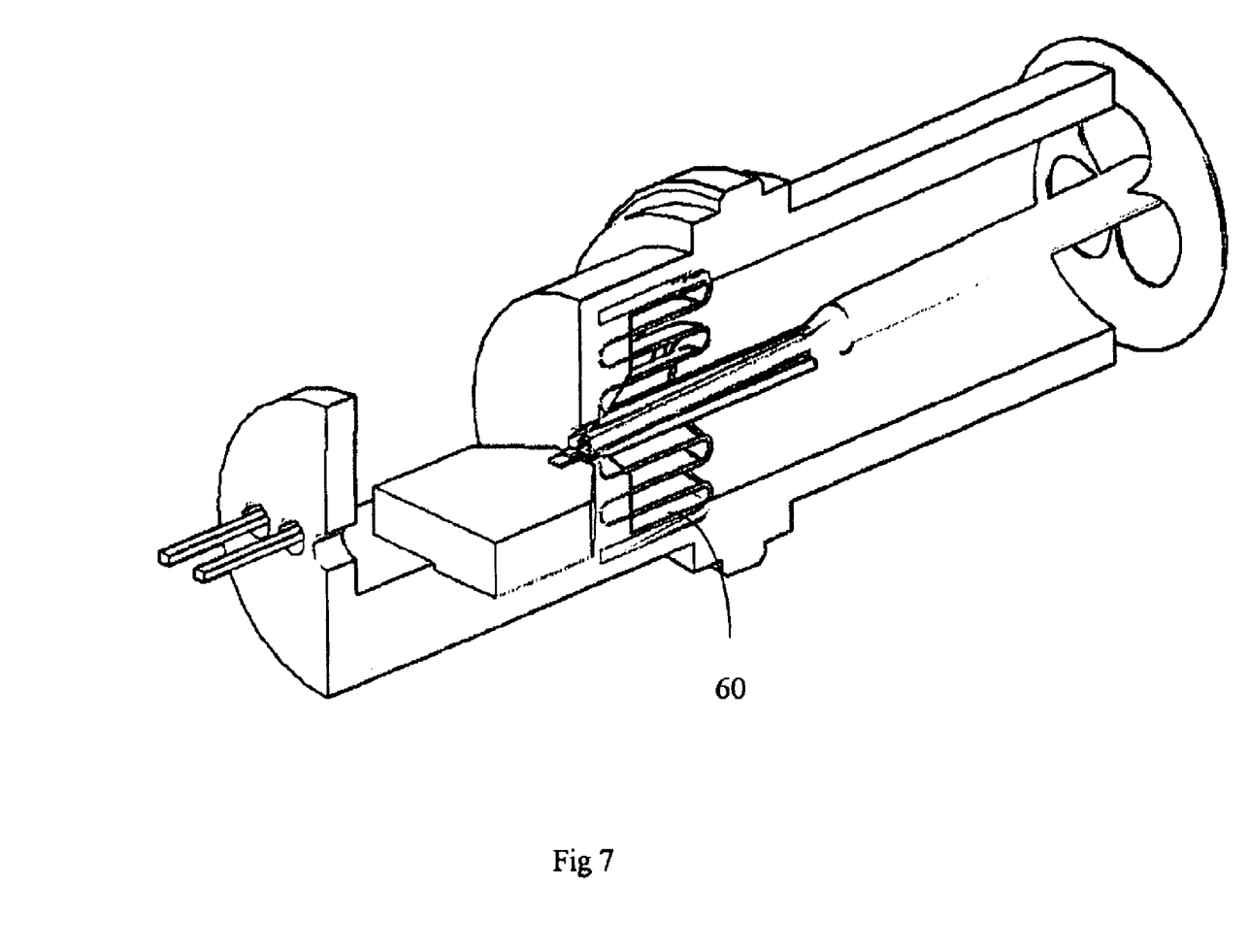
FIG. 7 is a perspective view, partially cut away, of an alignment device using the flexible joint of FIG. 6.

In an alternative embodiment which alleviates the sealing problem, illustrated in FIGS. 6 and 7 the universal joint is not be formed using a ball and socket, as described previously, but it is formed using a flexible material between the tube and the mount as illustrated in FIGS. 6 and 7.

What is claimed is:

1. A device for aligning an optical fiber with an output facet of a laser diode to obtain a substantially optimum coupling efficiency, said device comprising:
    a universal joint through which said optical fiber passes such that an end of said optical fiber is adjacent to said output facet of said laser diode; and
    an adjustment means located at a distance from said universal joint such that displacement of said adjustment means causes a pivotal movement of said optical fiber about a pivotal point of said universal joint and results in a smaller displacement of said end of said optical fiber,
    wherein said universal joint comprises a ball, having an aperture through a centre for receiving said optical fiber, a mount housing said ball, and biasing means for biasing said ball into an internal conical socket within said mount, said socket having an aperture through which said optical fiber protrudes.

2. A device according to claim 1, wherein said universal joint comprises a flexible material between said optical fiber and said mount.

3. A device according to claim 1, wherein said ball is magnetised, and said conical socket comprises a magnetic material.

4. A device according to claim 1, further comprising a focussing lens located between said end of said optical fiber and said output facet of said laser diode.

5. A device for aligning an optical fiber with an output facet of a laser diode to obtain a substantially optimum coupling efficiency, said device comprising:
    a universal joint through which said optical fiber passes such that an end of said optical fiber is adjacent to said output facet of said laser diode; and
    an adjustment means located at a distance from said universal joint such that displacement of said adjustment means causes a pivotal movement of said optical fiber about a pivotal point of said universal joint and results in a smaller displacement of said end of said optical fiber,
    wherein said adjustment means comprises a disk supporting said optical fiber having a spring for biasing ball into a socket, and in which displacement of said disk results in a pivotal movement of said fiber about a centre of said ball, and a corresponding smaller displacement of an end of said optical fiber.

6. A device according to claim 5, wherein said universal joint comprises a flexible material between said optical fiber and said mount.

7. A device according to claim 5, wherein said ball is magnetised, and said conical socket comprises a magnetic material.

8. A device according to claim 5, further comprising a focussing lens located between said end of said optical fiber and said output facet of said laser diode.

* * * * *